Nov. 10, 1953  C. O. SCOTT  2,658,792
SLIDING DOOR CONSTRUCTION FOR VEHICLE BODIES
Filed Feb. 28, 1950  3 Sheets-Sheet 1

INVENTOR.
Clifford O. Scott
BY
Murray, Sackhoff & Paddack
ATT'YS

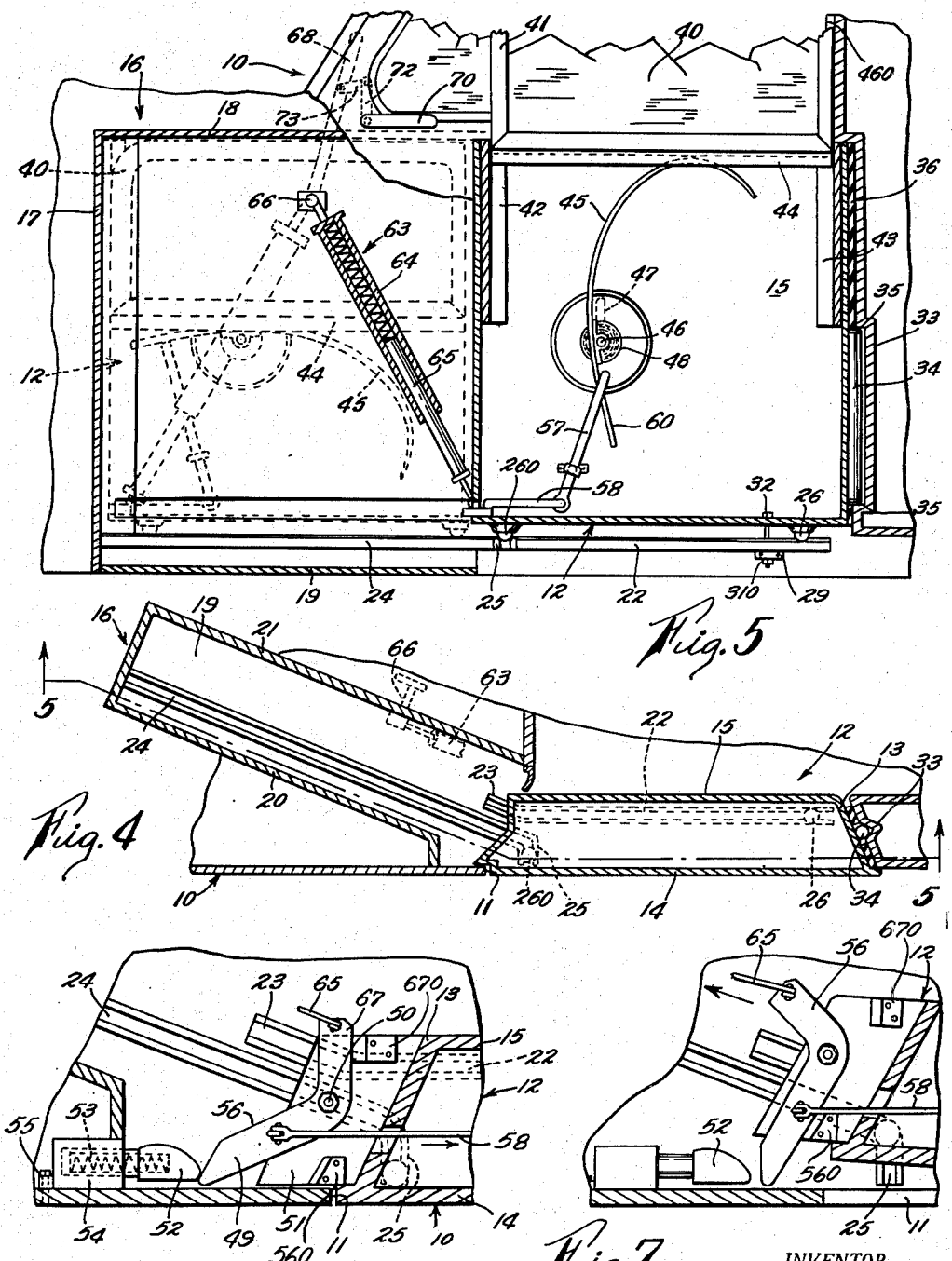

Nov. 10, 1953
C. O. SCOTT
2,658,792
SLIDING DOOR CONSTRUCTION FOR VEHICLE BODIES
Filed Feb. 28, 1950
3 Sheets-Sheet 3
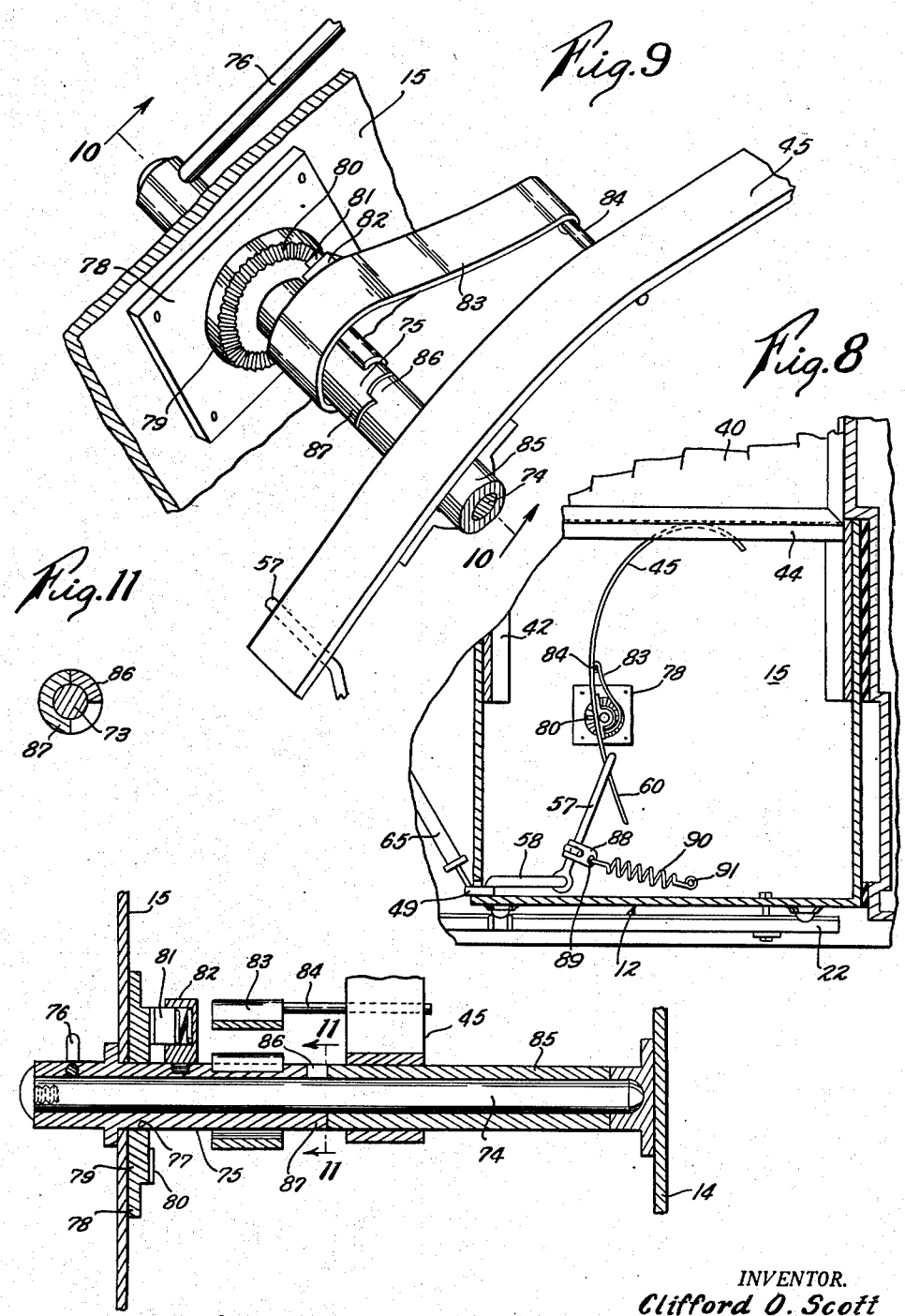
INVENTOR.
Clifford O. Scott
BY
Murray, Sackhoff & Murray
ATT'YS Patented Nov. 10, 1953

2,658,792

UNITED STATES PATENT OFFICE 2,658,792

SLIDING DOOR CONSTRUCTION FOR VEHICLE BODIES

Clifford O. Scott, Fort Mitchell, Ky.

Application February 28, 1950, Serial No. 146,811

11 Claims. (Cl. 296—47)

This invention relates to the bodies of vehicles, such as automobiles, aeroplanes and the like, and has particular reference to the entrance and exit doors of such vehicles and the means for maneuvering such doors into open and closed positions. This application is a continuation in part of my copending application Serial No. 62,954 filed December 1, 1948, for Improvements in Vehicle Bodies, and abandoned on March 9, 1950.

Heretofore it has been customary to support the doors of automobiles by means of hinges or the like so that they would swing or pivot around a substantially vertical axis in moving from a closed to an open position, or vice versa. In recent years, the trend in automobile body design has been toward increased over-all width of the body so that at the present time the overall width of the body itself is at least equal to, and in some instances even greater than, the over-all distance across the fenders of the older design of cars.

It has long been recognized that hinged or swinging doors on automobiles not only create an accident hazard when being swung open into the path of passing vehicles but such doors substantially restrict the storage capacity of parking garages and lots because of the need for sufficient space between adjacent cars to permit doors to swing open. These disadvantages of the present type of swinging doors have now become greater and extremely objectionable due to the greatly increased width of automobile bodies and the resulting need for still greater allowance for parking space between cars to enable the doors to be swung open.

The principal object of this invention is to provide an automobile body having an opening for exit or egress into and from its interior which is closed by a door structure comprising a lower housing portion and an upper window frame portion that is retractable into the lower portion, said retracted door portions being movable within the confines of the body into a space adjacent the door opening whereby said door may be maneuvered from closed to opened positions and vice versa without protruding beyond the external lines of the body.

Another object of the invention is to provide in an automobile body having the foregoing characteristics a single manually operable mechanism for actuating the movable parts of the structure, said mechanism having a manipulating device which is accessible either interiorly or exteriorly of the automobile body.

Another object is to provide an automobile body with a suitable compartment or space disposed within the confines of the body to one side of the door opening therefor and arranged to house the lower portion only of the door whenever one desires to enter or leave the body.

Another object is to provide a door actuating means that upon institution of a door opening operation acts to move one of the door sections into enclosed relation with the other section and thereafter moves both sections into the compartment provided therefor, said means including a mechanism that functions to return the retracted door portion to a preselected, extended position upon return of the door to closed position.

A further object of the invention is to provide in the so-called "passenger vehicle" body a front door which is maneuverable into a space within the cowl and front fender of the body and includes the provision of a door opening mechanism associated with a window retracting means which initiates window retracting movement into the door prior to moving the retracted door structure into the said space.

The accomplishment of these objectives will be conducive to the prevention of accidents, the saving of space in parking lots and garages, reduction in manufacturing costs and less investment in special tools, parts, and the like.

All of these objects and advantages will be apparent from the following specification and the accompanying drawings in which:

Fig. 4 is a section taken on line 4—4 of Fig. 2.

Fig. 5 is a cross section taken on line 5—5 of Fig. 4.

Fig. 6 is a detail of the latch and door guide mechanism of the invention.

Fig. 7 is a similar view of the door latch showing it in another operative position.

Fig. 8 is a fragmental section, similar to Fig. 5 illustrating a window preselector for the door and window operating mechanism shown in Figs. 1-7 of the drawing.

Fig. 9 is a fragmental perspective view of the window preselector shown in window retracted position.

Fig. 10 is a section taken on line 10—10 of Fig. 9.

Fig. 11 is a section taken on line 11—11 of Fig. 10.

Figure 1:
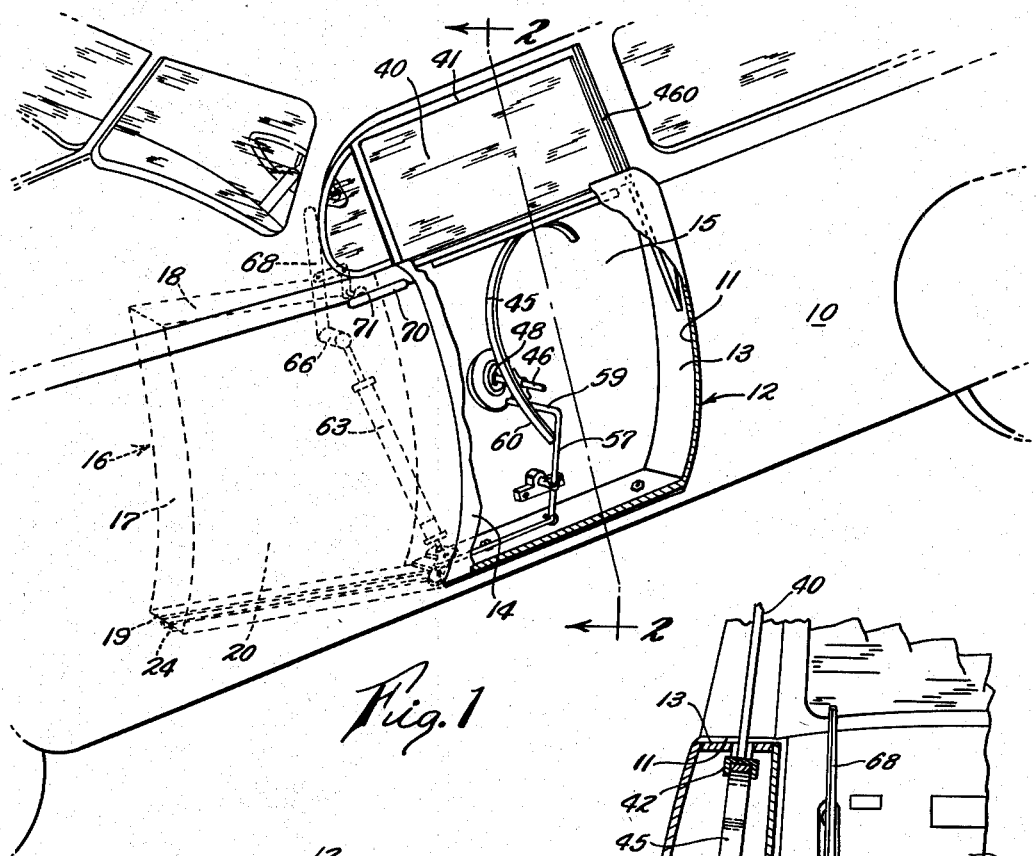
Fig. 1 is a fragmental, perspective view of a closed automobile body which is illustrative of the features and functions of my invention, and wherein some parts are broken away and other parts shown in cross section.

In the drawings the numeral 10 generally indicates a closed vehicle body embodying the features of the conventional "passenger" automobile. In this respect it will be noted with reference to Fig. 1 that the passenger compartment is rearwardly of the motor cowl and that the doors for the compartment have lower portions wholly located beneath the tops of the cowl and fenders for the body and adapted to receive upper window portions including the window frames which extend into the head space for the automobile body. The closed body may have one or more openings 11 therein for entrance into and for leaving its interior. As illustrated in the drawings and especially in Fig. 1 the opening is in the forward portion of the body side wall adjacent the operator's seat and the lower portion of the opening 11 is normally closed by a hollow door generally indicated by the reference numeral 12. The door is constructed with the usual rectangular frame 13 to which is secured an exterior door panel 14 and an interior panel 15.

The door is mounted for sliding movement into the body of the vehicle preferably beneath and behind the outer cowl and between the front fender and the motor block of the automobile. To this end a rectangular chamber 16 is disposed adjacent the door opening 11 and consists of a front wall 17, top wall 18, bottom wall 19, outside wall 20 and an inside wall 21. It will be noted that the compartment therefore has an open side adjacent the body opening 11 to permit forward movement of the door 12 from its closed position to an inoperative, door opened position within the compartment, and that the chamber extends into the body 10 of the vehicle at an angle with the door opening so that said door may be stored within the contour of the vehicle body.

A pair of guide rails 22 extend along the interior of the bottom of the door opening 11 and have their end portions 23 disposed at a slight angle to the main portion and extend a short distance into the compartment 16 (Figs. 4, 6 and 7). A second set of guide rails 24 extend along the exterior side of the compartment bottom wall 19 and have their end portions 25 extending into the adjacent side of the body opening. As illustrated in Figs. 4, 6 and 7, the portion 25 is directed outwardly and substantially transversely of the door opening for the purposes to be hereinafter described.

Figure 3:
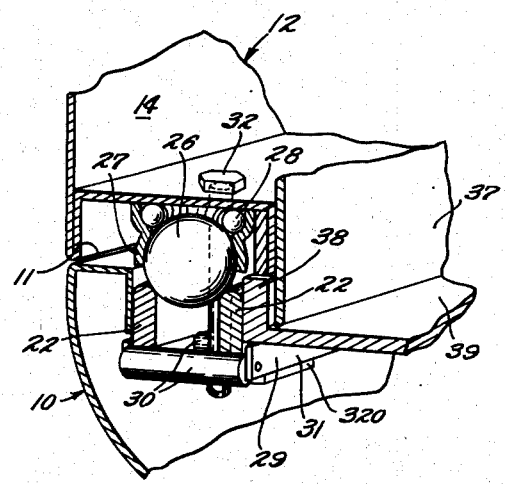
Fig. 3 is a sectional detail shown partly in perspective and illustrating the guide means for the sliding door of this invention.

In Fig. 3 there is shown a ball type roller 26 which is rotatably mounted in a suitable bearing 27 fixed to the underside of the bottom frame member for the door, said ball being freely movable in the bearing by means of a circular row of antifriction ball bearings 28 interposed between the surface of the ball and said frame member. As illustratd in Figs. 4 and 5 one roller 26 is guided in rails 22 whilst a similarly constructed roller 260 is engaged in guide rails 24. The door is held in upright position during its sliding movement by means of a roller truck 29 positioned adjacent the roller 26. The truck comprises a pair of rollers 30 carried in a frame 31 which is secured to the door by a bolt 32 that passes through the lower member of the door frame 13, between the set of rails 22 and through a cross member 320 of the frame 31 and has threaded to its end a retaining nut 310. With reference to Figs. 4 and 5 the door is aligned within the opening by a V-shaped slot formed in the lower portion of the body opening and which receives an elongated rod 34 fixed to the door frame by end mounting plates 35. The door has the usual weather sealing strips 36 between it and the door opening and as illustrated in Fig. 3 the bottom edge of the door is sealed by a strip 37 which overhangs an upturned flange 38 formed along the edge of the floor 39 of the vehicle body.

As will be more fully set forth hereinafter a means for maneuvering the door and window structure from closed to open position and vice versa, may be of any suitable character but I prefer to employ an actuating device which in this instance is shown as comprising a rotatable shaft 66 mounted on the inside wall 21 which has secured thereto a lever 68 disposed in the vicinity of the left-hand corners of the instrument board 69 (Fig. 2) and also a spring-loaded extensible arm 63 which comprises an outer tubular section 64 and a telescopic section 65 which at its lower extremity is pivotally connected to an arm 67 of a bell-crank lever and latch 49.

As has been stated the sliding door 12 is adapted to close the lower portion of the body opening whilst a suitable window 40 and its frame 41 is adapted to selectively close all or part of the body opening above the door. The window and its frame is mounted within the door for relative sliding movement therefrom into the upper portion of the body opening. To this end the sides of the window are slidably mounted in spaced channel members 42—43 (Fig. 5) fixed to the vertical members of the door frame 13 and is supported on an inverted channel 44 which engages an elliptical arm 45 mounted intermediate its ends on a rotatable cross shaft 46 journaled in the side panels of the door.

As most clearly shown in Figs. 1 and 5 the window is received in a channel 460 secured in a suitable post of the vehicle body, said channel being in vertical alignment with window mounting channel 43 when the door is in closed position. In the automobile body illustrated the front edge of the window meets with the rear edge of a suitable ventilating "wing" type window, said edges being furnished with a sealing strip in the usual manner. Obviously other types of window regulators and guides for the upper part of the opening could be employed without departing from the spirit of this invention.

The shaft 46 has fixed to its inner end a manually operable lever 47 and has associated therewith a coil spring 48 which constantly urges the arm toward window closed position with sufficient force to retain the window in any predetermined selected position. As is clearly indicated in Fig. 5, by comparison of the dotted and full line showings of the window 40, manual movement of the lever 47 through approximately 90° results in rotating the elliptical arm 45 through an arc sufficient to move the window from its fully closed position to its open position.

Figure 2:
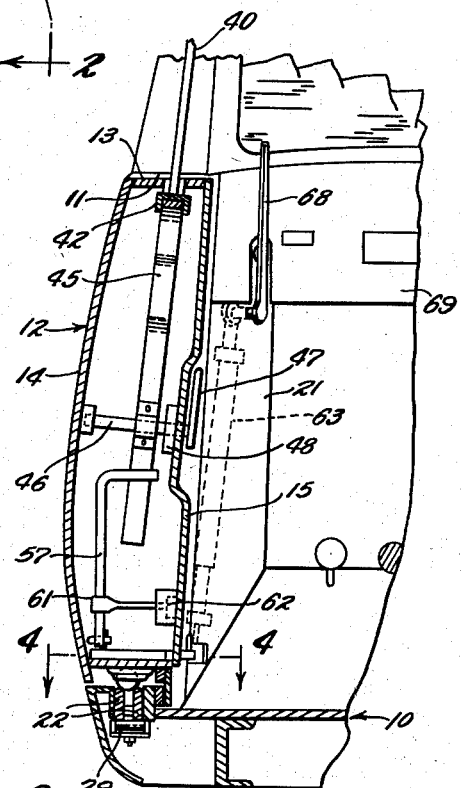
Fig. 2 is an enlarged cross sectional view taken on line 2—2 of Fig. 1.

The actuating device for maneuvering the door includes a door latch which is best illustrated in Figs. 6 and 7 and comprises a bell-crank lever 49 pivotally mounted at 50 to an extension 51 disposed near the bottom of the door. The lever engages a spring pressed keeper 52 which is mounted for longitudinal movement in a bore 53 of a block 54, the latter being secured to the automobile body 10 by bolts 55. The outer camming arm 56 of the bell-crank lever is connected to a pivoted quick acting lever 57 within the door by a link 58, said lever 57 having an inturned extension 59 at its upper end which in turn is in sliding engagement with the lower portion 60 of the elliptical lever 45. As illustrated in Fig. 2 the lever 57 is pivoted to the interior panel 15 of the automobile door by a shaft 61 rotatably mounted in a journal bearing block 62 secured to the outer side of said wall. The lever 57 has its major arm in contact with the lower portion 60 of the elliptical arm adjacent its pivotal shaft 46 so that upon initial movement of the lever 49 toward the released position illustrated in Fig. 7 the window 40, if it is closed, or in partially closed position, will be instantly lowered within the door.

The movement of the door is manually controlled by a spring loaded, extensible arm 63 which comprises an outer tubular member 64 and a telescopic section 65 which are respectively connected to a rotatable shaft 66 mounted on the inside wall 21 and an inwardly extending arm 67 of the bell-crank 49 for the latch. With reference to Fig. 6, it will be noted that the normal door retaining position of the bell-crank is established by a stop 670 which is shown as a bracket secured to extension 51 of the door rearwardly of the arm 67 of the bell-crank. As has been stated the telescopic, spring loaded arm sets up a clockwise force in the bell-crank (Fig. 6) when the door is in closed position or is being moved to said position, and contact of the bell-crank with the stop 670 positively secures the crank in its door closing position during said door movement, and in door closed position, so that the arm 56 may cooperate with keeper 52 in latching the door.

A manually operable lever 68 is fixed to the inner end of shaft 66 and extends upwardly in the vicinity of the left-hand corner of the instrument panel 69 of the automobile body (Fig. 2). The lever 68 is provided for opening and closing the door from the body interior whilst a door handle 70 is employed for opening the door exteriorly of the body. The handle 70 is connected by a journaled shaft 71 to a lever 72 that has its free end connected to an intermediate part of lever 68 by a loose link 73 (Fig. 5).

In operation, therefore, the door 12 is normally positioned in the lower portion of the vehicle body opening 11 by means of bell-crank lever 49 and its connections with the keeper 52 and the spring loaded, extensible arm 63. In this position the door is supported upon the guides by universal rollers 26 each positioned, as illustrated in Fig. 4, in the right-hand portions of their respective guides. The quick acting window mechanism will be in the position illustrated in Fig. 5, whilst the elliptical arm 45 for the window might be in any selected or desired position between its fully closed position indicated in full lines in said figure or its fully lowered position indicated in dotted lines therein. When it is desired to open the door the control lever 68 is manually rotated in a clockwise direction as illustrated in Fig. 5 and the spring loaded, extensible arm 63 will be rotated in a similar direction to cause counterrotation of the bell-crank lever 49 from a position illustrated in Fig. 6 to its position assumed in Fig. 7. Initial rotation of the bell-crank lever rotates its arm 56 into camming engagement with the vehicle body thereby moving the adjacent side of the door inwardly to the position illustrated in Fig. 7, where said arm engages against a stop 560 fixed on the door extension 51 thus arresting rotation of the bell crank lever so that the door may be moved into the compartment 16 on its guides under the control of the extensible arm 63. As has been stated initial movement of the bell-crank lever will cause the lever 57 to quickly move the elliptical arm 45 to its full window lowered position within the door before the door is moved by the arm 63 to its dotted line, open position within the compartment (Fig. 5). To close the door it is only necessary to manually rotate the lever 68 in a counterclockwise direction which results in movement of the door out of the compartment and movement of the lever 49 to a position illustrated in Fig. 6 where it again is latched behind the keeper 52.

As has been stated the coil spring 48 is adapted to retain the window in a selected position and it therefore is incapable of raising said window. A means for returning the window to a preselected closed position when the door is closed is illustrated in Figs. 8–11, inclusive, wherein the mechanism shown is mounted between interior panel 15 and exterior panel 14 in place of shaft 46, coil spring 48 and lever 47. The mechanism comprises a mounting shaft 74 secured to the interior side of panel 14 and extending through panel 15. On this shaft there is journaled a sleeve 75 carrying a manually operated lever 76. This sleeve passes through an opening 77 in a plate 78 that is fixed to the interior wall of panel 15, said plate having a raised boss 79 formed with an annular row of radial teeth 80. The teeth are engaged by a spring pressed, toothed pawl 81 carried in a bore formed in a lug 82 threaded to the sleeve 75. The sleeve also has fixed thereto the inner end of coil spring 83 which has a pin 84 fixed to its outer end in position to extend under the elliptical arm 45 that engages channel 44 beneath the window frame 41. As shown in Fig. 10 the elliptical arm 45 is fixed on a sleeve 85 rotatably mounted on shaft 74, said sleeve 85 having an arcuate lug 86 on its inner end which extends into the path of an arcuate lug 87 on the outer end of sleeve 75. With reference to Fig. 11 it will be noted that there is provided approximately 90° lost motion between these lugs and between the relative motions of the window preselector mechanism and the elliptical arm 45.

The coil spring 83 may therefore be placed under varying tension by rotation of the sleeve 75 by means of the lever 76 and the adjusted position of the lever will be maintained by engagement of the toothed pawl 81 with the toothed boss 79 by reason of the fact that the spring urged force of the pawl is greater than the force exerted by the coil spring on arm 45. Placing the coil spring 83 under varying tension will cause pin 84 to bear upwardly on arm 45 and move it to a preselected, vertical position in the body opening depending on the setting of lever 76 and the tension created thereby on the coil spring 83, a relatively light tension on the spring 83 causing the window to be positioned in the lower part of the window opening, whilst maximum tension of the spring will move and maintain the window in fully closed position.

An overcenter booster or auxiliary device is provided for the lever 57 to initially overcome the adjusted tension on the window raising spring 83 when the door is to be opened by the lever 70 and the associated door operating mechanism. This booster is shown in Fig. 8 as an arm 88 fixed to the pivotal mounting of the lever 57 and extending laterally therefrom, the outer end of said arm pivotally engaging at 89 the adjacent end of a compression spring 90, in turn pivoted at its opposed end on a pin 91 that is anchored in the door panel 15. When the lever 57 is in its inoperative position illustrated in Fig. 8, the pivot connection 89 is just beyond dead center with respect to the spring anchor pin 91 and the pivotal mounting for lever 57, to maintain the lever in inoperative position and upon initial actuation of the door opening mechanism, the booster will pass over dead center and the force of the compression spring 90 will urge the lever toward its window lowered position thus overcoming the force of the window preselector spring 83 which normally functions to raise and maintain the window in a selected position within the body opening.

With reference to Figs. 9–10 the lost motion lugs are shown in relative positions assumed when the window frame is in its lowermost, open position wherein the spring 83 exerts no appreciable force on arm 45. If a fully closed window position is desired after the door is closed the lever 76 is turned 90° counterclockwise, as illustrated in Fig. 9, thus placing full tension on the spring 83 to raise and hold the window in said closed position. Now when the door is to be opened the lever 70 is operated, which, through the mechanism described including the overcenter booster device, initially lowers the window through lever 57 and the counterrotation of arm 45 as it is illustrated in Fig. 8. The full 90° lost motion between the lugs 86—87 will be realized during the door opening function and upon return of the door to closed position, and the lever 57 to its inoperative position, the coil spring 83 will operate to return the window to its preselected closed position whereby the vehicle body is closed and may be locked shut in the usual manner against unauthorized tampering. It will be obvious that the preselector may be adjusted to maintain the window in partially closed, or fully opened positions and that upon closing the door the window will be returned to such preselected position by the coil spring 83.

What is claimed is:

1. In a closed vehicle body having a vertically elongated opening for entrance and exit, the combination of a vertically foreshortened recess formed within the confines of the body and disposed therein in communication with the lower part of the opening, a door structure normally adapted to close the opening and including an upper section having a portion thereof normally extending above the level of the recess and a lower section disposed to one side of said recess and beneath the upper section, a preselector device between the upper and lower sections and adapted to maintain the upper section within the lower section or automatically raise the upper section to a selected position within the body opening, upon return of the lower section to normal position, actuating means carried by the lower section and operatively connected to the upper section for lowering the upper section into the lower section, control means mounted on the vehicle body for sliding the collapsed door into the recess and return, and means providing an operative connection between the control means and the actuating means for initially lowering the upper section into the lower section before moving the collapsed door into the recess.

2. A motor vehicle comprising a closed body having an opening therein, a chamber within the body disposed adjacent the lower end of the said opening, a door closing the lower portion of the opening and slidable into the chamber, a window mounted within the door for vertical movement into and out of the upper portion of said body opening, manually operable means on the body for controlling the sliding movement of the door, a door latch on the door connected to the manually operable means and releasable by the initial operation of said means, and quick acting means on the door and connected with the latch for lowering the window into the door before the latter is moved into the compartment.

3. A motor vehicle comprising a body having a door opening therein, a chamber disposed adjacent one side of the opening, a door closing said opening and adapted for edgewise sliding movement from a position closing the opening to a position entirely within the chamber, a spring-loaded extensible arm having one section pivotally connected to the lower portion of the leading edge of the door, and having its other section pivotally mounted on the vehicle body in a position above, and intermediate the path of travel of the pivot connection of the arm with the door, and means for oscillating the arm.

4. The combination of a vehicle body having a door opening, of a sliding door for closing said door opening, a chamber formed between the inner wall and the outer wall of said body to house the sliding door when said door is in open condition, a latch lever pivotally mounted on the lower portion of the sliding door, a spring-loaded extensible arm having one section connected to an off-center portion of the latch lever and its other section pivotally mounted on the vehicle body in a position above, and intermediate the path of travel of, the latch lever, means for oscillating the arm, said latch lever being operable upon initial actuation of the extensible arm to cam against an adjacent portion of the car body to cause the leading edge of the sliding door to be pushed inwardly and allow the door to pass behind the outer wall of the vehicle and enter the chamber, a stop fixed on the door in a position to define the closed position of the latch lever during return movement of the door to closed position, and a spring operated door catch mounted on the body in the path of the latch lever and adapted to engage said latch to maintain the door in closed position.

5. A motor vehicle comprising a body having an opening therein, a chamber disposed adjacent one side of the opening and extending into the body at an angle with said opening, a door normally closing said opening and slidable into said compartment, a first guide rail along the exterior side of the compartment bottom and having an end portion extending into the adjacent side of the body opening, said end portion turned and directed transversely across the body opening, a second guide rail extending along the interior side of the bottom for the body opening and having one end turned inwardly into the compartment, and disposed parallel to the first guide rail, a roller on the bottom of the door engaged in the first guide rail and adapted upon initial movement from, and final movement into normal position to move the adjacent end of the door transversely into and from the compartment, and another roller engaged in the second guide and acting as a stationary fulcrum for the door during its said initial and final movements.

6. A motor vehicle as set forth in claim 5 wherein the second guide rail has a pair of spaced tracks and a door stabilizing truck is in rolling engagement with the underside of the tracks and is held in fixed position thereon relative to the door by a bolt secured to the bottom of the door and to the truck and extending between the spaced tracks.

7. A motor vehicle comprising a body having an opening therein, a chamber adjacent said opening and extending into the body at an angle to said opening, a door normally closing said opening and slidable into the compartment, guide means supporting said door and fixed to the body for providing inward, transverse movement for the side of the door adjacent the compartment during its initial and final movements from and to normal position, a latch lever mounted on the door, a cam arm on the lever adapted for engagement with the vehicle body, a control means mounted for pivotal movement on the vehicle body and having an operable connection with the latch lever, and means for actuating the control means whereby upon initial operation of the control means the cam is urged against the body to initially move the associated door end into position for sliding movement into the chamber.

8. A motor vehicle comprising a body having an opening therein, a chamber adjacent said opening and extending into the body at an angle to said opening, a door normally closing said opening and slidable into the compartment, guide means supporting said door and fixed to the body for providing inward, transverse movement for the side of the door adjacent the compartment during its initial and final movements from and to normal position, a latch lever mounted on the door, a cam arm on the lever adapted for engagement with the vehicle body, a spring loaded, extensible arm mounted for pivotal movement on the vehicle body and having an operable connection with the latch lever, and manual operable means for actuating the spring loaded, extensible arm whereby upon initial operation of the spring loaded, extensible arm the cam arm is urged against the body to initially move the associated door end into position for sliding movement into the chamber.

9. A motor vehicle as set forth in claim 8 wherein the latch lever comprises a bell-crank extending transversely of the door, the exterior arm adapted to engage the vehicle body and the opposite arm being connected to the extensible arm.

10. A motor vehicle comprising a closed body having a vertically elongated opening therein, a chamber within the body disposed adjacent the said opening, a door closing the lower portion of the opening and slidable into the chamber, a window mounted for endwise sliding movement within the door and extensible from its upper end into the upper portion of the body opening, window raising mechanism on the door for raising and lowering the window in the opening to a selected position, manually operable means on the body for controlling the sliding movement of the door, a door latch on the door connected to the manually operable means and releasable by the initial operation of said means, quick acting means on the door connected with the latch for overcoming the window raising mechanism and lowering the window into the door before the latter is moved into the chamber, and means associated with the window raising mechanism for automatically returning the window to said selected position upon return of the door to its closed position.

11. A motor vehicle comprising a closed body having a vertically elongated opening therein, a chamber within the body disposed adjacent the lower side of the said opening, a door closing the lower portion of the opening and slidable sidewise into the chamber, a window mounted for endwise sliding movement within the door and extensible from its upper end into the upper portion of the body opening, window raising mechanism having a first rotatable member journalled in the door, means for operating said member to raise and lower the window to a selected position in the body opening, a second window supporting member rotatably mounted within the door in axial alignment with the first member, a lost motion connection between said members, means for retaining the first member in the selected position, and spring means fixed on the first member and effective to bias the second member toward said selected position, manually operable means on the body for controlling the sliding movement of the door, a door latch on the door connected to the manually operable means and releasable by the initial operation of said means, and quick acting means on the door connected with the latch and the window supporting member for overcoming the spring means to lower the window into the door before the latter is moved into the chamber, said spring being adapted upon return of the door to closed position to automatically return the window to the selected position.

CLIFFORD O. SCOTT.

References Cited in the file of this patent
UNITED STATES PATENTS

| Number | Name | Date |
|---|---|---|
| 1,195,473 | Jackson et al. | Aug. 22, 1916 |
| 1,712,588 | Small | May 14, 1929 |
| 1,768,983 | Hurley | July 1, 1930 |
| 2,020,817 | Wexelburg et al. | Nov. 12, 1935 |
| 2,548,950 | Coles | Apr. 17, 1951 |
| 2,628,860 | Darrin | Feb. 17, 1953 |